United States Patent Office 3,532,731
Patented Oct. 6, 1970

3,532,731
PREPARATION OF ALPHA - TRIORGANOSILOXY-OMEGA-HYDROXY-DIORGANOPOLYSILOXANES
Paul Hittmair, Siegfried Nitzsche, and Ernst Wohlfarth, Burghausen, Upper Bavaria, and Manfred Wick, Munich, Germany, assignors to Wacker-Chemie G.m.b.H., Munich, Bavaria, Germany
No Drawing. Filed May 21, 1968, Ser. No. 730,932
Claims priority, application Germany, May 31, 1967, W 44,083
Int. Cl. C07f 7/02
U.S. Cl. 260—448.2                    7 Claims

ABSTRACT OF THE DISCLOSURE

Linear siloxane polymers of the general formula $R_3SiO[R_2SiO]_xH$ where R is an organic radical and $x$ is at least 10 are prepared by reacting cyclic diorganosiloxanes with triorganohalogenosilanes of the formula $R_3SiX$ employing ferric chloride as a catalyst in an organic solvent at temperatures of 10° to 200° C. and the $X[R_2SiO]_xSiR_3$ product is further reacted with an alkali metal hydrogen carbonate under anhydrous conditions to produce the desired product. The organosilicon products can be used as plasticizers in silicon resins and rubber formulations.

This invention relates to a process for preparing alpha-triorganosiloxy-omega-hydroxy-diorganopolysiloxanes.

It has been known to prepare linear siloxane polymers having both triorganosiloxy and hydroxy endblockers and the usefulness of such polymers is well recognized. One known method for preparing these polymers is to react linear hydroxyl endblocked diorganosiloxanes with triorganosiloxanes such as hexaorganodisiloxanes in the presence of equilibration catalysts such as potassium hydroxide. This method produces a mixed product containing largely uncontrolled proportions of siloxanes having hydroxyl endblockers on both terminal silicon atoms, siloxanes having triorganosiloxy endblockers as terminal silicon atoms, and the desired siloxanes having one hydroxy endblocker and one triorganosiloxy endblocker. Alternatively, a cyclic siloxane may be reacted with a low molecular weight triorganosiloxy endblocked diorganosiloxane (e.g. $R_3SiOSiR_3$) and the primary product will be higher polymeric species of the triorganosiloxy endblocked diorganosiloxanes which must be split with water to introduce the desired hydroxyl endblockers. Finally, the catalyst employed (e.g. KOH) must be deactivated and/or removed from the reaction mass and this is often difficult to accomplish and expensive in terms of time and equipment requirements.

Another process for preparing the desired

polymers consists of condensing siloxanes of the type $HO(R_2SiO)_xH$ with triorganosilanol or an oligomeric triorganodiorganosiloxanol in the presence of condensation catalysts to accelerate the condensation of the hydroxyl groups bonded to silicon (e.g. calcium oxide, metal salts of carboxylic acids, organic amines, alkali metal salts of phenols). However, this method requires prior preparation of the silanols and siloxanols which is not a simple task and the process is difficult and time consuming. Thus, trimethylsilanol is difficult to isolate and the yields of silanol and siloxanol obtained are unsatisfactory because of competing reactions occurring simultaneously (e.g. formation of $R_3SiO[R_2SiO]_xSiR_3$).

A further proposed method for preparing the desired $HO(R_2SiO)_xSiR_3$ involves reaction of $HO(R_2SiO)_xH$ with triorganohalogenosilanes in the presence of hydrogenhalide acceptors such as pyridine, picoline, trialkylamines and ammonium. This method also produces large proportions of $R_3SiO(R_2SiO)_xSiR_3$ in addition to the desired product hence the product mix will require separation (always a difficult process) or use of an uncontrolled mixture of polymer types. Furthermore, removal of the hydrogenhalide acceptor is often difficult and is always a further processing step adding to the cost of the final product.

It is also known to react $HO(R_2SiO)_xH$ with low molecular weight $R_3SiO(R_2SiO)_yH$ to produce higher polymers of the desired configuration. This merely adds a further step to one of the previously described procedures because the low molecular weight

must first be prepared. Further, competing reactions as well as difficulties encountered in miscibility of reactants when phenylsiloxanes as well as methylsiloxanes are employed reduce the value of this method.

Accordingly, a simple and economically sound method for producing the desired $R_3SiO(R_2SiO)_xH$ polymers has been sought and is the object of the present invention. A method avoiding the difficulties outlined above and producing the desired polymers in good yield and acceptable purity is also an object of this invention. A further object is a method for producing the desired polymers in good yield and controllable and uniform polymeric species. Other objects and advantages of this invention are detailed in or will be apparent from the description and claims following.

This invention is a method for preparing siloxane polymers of the average general formula

where R is a monovalent hydrocarbon or halogenohydrocarbon radical and $x$ is at least 10 comprising (A) reacting (1) diorganocyclosiloxanes of the general formula $(R_2SiO)_y$ where $y$ is at least 3 and preferably does not exceed about 12, and R is as above defined with (2) triorganohalogenosilanes of the formula $R_3SiX$ where X is a halogen atom and R is as above defined, in the presence of (3) iron (III) chloride, at a temperature of from 10° C. to 200° C. and (B) thereafter reacting the product from (A) with an alkali metal hydrogen carbonate under anhydrous conditions to produce the desired product. The product obtained from reaction (A) is a polymer of the average general formula $X[R_2SiO]_xSiR_3$ which is converted to the desired polymer in reaction (B).

The cyclic diorganosiloxanes employed are well-known materials produced by standard, well documented methods. Preferred cyclosiloxanes are those having 3 to 12 silicon atoms per molecule and most preferred are those having 4 to 9 silicon atoms (i.e. $y=4$–9). However, macromolecules wherein $y$ is larger than 12 could be used though no advantage is realized and processing difficulties are multiplied.

The triorganohalogenosilane ($R_3SiX$) is also a well-known, widely documented, commercially prepared material. The halogen (X) can be F, Cl, Br or I but Cl is most preferred because of availability. The trimethylchlorosilane is the preferred silane.

In both the cyclosiloxane reactant (1) and the silane reactant (2) the organic radicals bonded to silicon through C—Si bonding and represented by R can be any of the well documented monovalent hydrocarbon and halogenohydrocarbon radicals set forth in the prior organosiloxane art. Thus, R can be alkyl, alkenyl, alkynyl, cycloalkyl, cycloalkenyl, aryl, aralkyl, and alkaryl radical and any halogenated derivative of said radicals and those radicals having 1 to 18 carbon atoms are preferred.

Specific mention can be made of methyl, ethyl, propyl, octadecyl, vinyl, allyl, CH≡C—, CH≡CCH₂—, cyclohexyl, cyclohexenyl, phenyl, phenylethyl, ethylphenyl, chloromethyl, bromovinyl, and 3,3,3-trifluoropropyl, among others. Preferred are the methyl and phenyl radicals. The radicals bonded to any one silicon atom can be the same or different and in any molecule different silicon atoms can be differently substituted. Mixtures of silanes and/or cyclosiloxanes can be employed.

The ferric chloride [iron (III) chloride] employed as the catalyst in reaction (A) herein can be incorporated in anhydrous form or as a hydrate. The anhydrous ferric chloride is preferred. The ferric chloride is employed in catalytic quanities. Generally, the ferric chloride will be employed in proportions from 0.005% to 10% by weight based on the weight of cyclosiloxane (1) employed and the preferred amount of ferric chloride is from 0.01% to 1.0% by weight on the stated basis.

The reaction (A) can be carried forward at room temperature if desired but the reaction rate is such that several hours to several days may be required to complete the reaction at room temperature hence elevated temperatures in the range 50° to 200° C. are generally employed to achieve the desired reaction in a shorter period of time (i.e. 30 minutes to 12 hours) and the preferred temperature range is 80° to 150° C. Pressure is not critical to the reaction and atmospheric, sub-atmospheric or super-atmospheric pressure can be employed as desired.

The reaction can advantageously be carried forward in an organic solvent. The choice of solvent is critical only in that the solvent cannot react with the reactants and products of the invention. Operable solvents include aliphatic and aromatic hydrocarbons, including chlorinated hydrocarbons, and benzene and toluene are preferred.

The viscosity of the reaction product, which is a measure of the average molecular size, can be controlled very simply by controlling the proportion of triorganohalogenosilane employed. The larger the proportion of silane employed, the lower the ultimate viscosity. After the desired end viscosity has been reached for the polymeric product of reaction (A), the endblocking halogen atom is replaced by a hydroxyl group by further reaction (B) with an alkali metal hydrogen carbonate such as sodium or potassium hydrogen carbonate, the reaction (B) is carried forward under anhydrous reaction conditions and according to the equation ≡SiCl+NaHCO₃→ ≡SiOH+NaCl+CO₂↑

It is expedient to dilute the reaction product from (A) with an inert organic solvent before adding the alkali metal hydrogen carbonate in reaction (B), particularly when high viscosity polysiloxane products are produced. At the same time, the ferric chloride is converted to ferric hydroxide which is precipitated during the reaction (B). The ferric chloride catalyst thus is inactivated and can be removed from the reaction product by filtering or other well-known mechanical separation means. The removal of the iron compound from the reaction mass will also result in separation and removal of the alkali metal halide and excess alkali metal hydrogen carbonate present in the reaction product. After filtration, the polymeric product is freed of solvent and other volatile components by distillation, under reduced pressure if desired.

The amount of alkali metal hydrogen carbonate employed can be readily calculated on the basis of the halogen atoms present in the polymeric molecules which in turn is determined by the proportion of R₃SiX employed. At least one molecule of alkali metal hydrogen carbonate is required for each halogen atom present and a molar excess is desirable to insure complete replacement of ≡SiX groups by ≡SiOH groups. Of course, the proportions of cyclosiloxane (1) and silane (2) employed will depend upon the desired average molecular weight of the product and can vary from equimolar amounts to one mol silane per 1000 or more mols of siloxane. The value of $x$ in the polymeric products should be at least 10 and can be almost as large as desired but preferably does not exceed 5,000.

The method of this invention is particularly useful for preparing alpha-triorganosiloxy-omega-hydroxydiorgano-polysiloxanes of high molecular weight and therefore not distillable. The high molecular weight polymers are produced because the reaction proceeds unequivocally and the catalyst can be removed in a simple and fully effective manner hence the product is essentially free of catalyst.

The products of the method of this invention can be employed as plasticizers in a variety of silicone resin and rubber formulations used as molding compounds and protective coatings. Because of the single hydroxyl group in the polymeric structure, the polymeric plasticizer is chemically bonded in the cured product and is thus held in place and cannot migrate or bleed. This solves the aggravating problem of plasticizers which migrate and are lost, which problem is encountered with those plasticizes which do not take any part in the chemical reaction.

The polymers of this invention can be employed as plasticizers per se or they may be pre-reacted with difunctional silanes of the general formula R₂SiZ₂ where R is as above defined and Z is an alkoxy, aryloxy, acyloxy, amino, aminoxy or oxime radical.

When the polymers of this invention are pre-reacted as suggested above, it is advantageous to employ at least one mol of the silane per mol of hydroxyl substituent present in the polymer. The reaction proceeds by condensation between the hydroxyl groups on the polymer and the Z groups in the silane in accordance with the equation

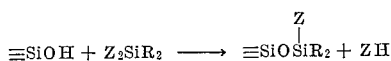

This reaction will occur at room temperature and can be accelerated by applying heat. The compound ZH produced as a by-product can be removed by distillation if desired. This reaction permits the incoproation of any desired functional group (Z) into the R₃SiO(R₂SiO)ₓH polymers produced herein and adds to the usefulness of these polymers.

Specific areas wherein the polymers of this invention can be employed are illustrated in the prior art, e.g. U.S. Pats. No. 3,070,566, dated Dec. 25, 1962, and No. 3,274,145, dated Sept. 20, 1966.

The following examples are included herein to assist those skilled in the art to gain a thorough understanding of the invention and not to limit the scope of the invention which is set forth in the claims. All parts and percentages are on a weight basis and all viscosities were measured at 25° C. unless otherwise stated. The symbols Ph and Me are employed to represent the phenyl and methyl radicals respectively.

EXAMPLE 1

Five mixtures numbered (I) through (V) were prepared by admixing (I) 0.73 g., (II) 1.09 g., (III) 2.18 g., (IV) 4.37 g. and (V) 8.73 g. of trimethylchlorosilane (Me₃SiCl) each with 4.00 g. of octamethylcyclotetrasiloxane [(Me₂SiO)₄] and 160 mg. FeCl₃. The mixtures were allowed to stand at room temperature and after seven days no further increase in viscosity could be observed hence the reaction was complete. The individual mixtures were then further reacted by vigorously stirring with sodium bicarbonate under anhydrous conditions, employing 9 g. of sodium bicarbonate for mixtures (I), (II) and (III), 12 g. for mixture (IV) and 24 g. for mixture (V). Mixture (V) was not diluted with solvent, but mixtures (I) through (IV) were diluted with benzene employing 350 ml. of benzene for each mixture. The insoluble components were filtered off and the filtrates were freed by solvent and volatile components by distillation, first at normal pressure and then at 10 torr at a bath temperature of 150° C. The resulting products were alpha-trimethylsiloxy-omega-hydroxy-dimethylpolysiloxanes having viscosities as follows:

|     | Cps. |
| --- | --- |
| (I)   | 169,000 |
| (II)  | 56,800 |
| (III) | 5,200 |
| (IV)  | 290 |
| (V)   | 177 |

EXAMPLE 2

A mixture was prepared by adding 2.57 g. of $Me_3SiCl$ to 300 g. of $[Me_2SiO]_4$ and 120 mg. $FeCl_3$. The mixture was heated for 15 hours at 100° C. with concurrent stirring. After cooling to room temperature, the reaction mixture was diluted with 200 ml. of benzene and further reacted with 12 g. of sodium bicarbonate under anhydrous conditions. Further processing as in Example 1 was carried forward and the product was identified by standard analytical techniques as $Me_3SiO[Me_2SiO]_xH$ having a viscosity of 1050 cps.

The foregoing reaction was repeated employing 300 mg. of $FeCl_3$ in place of the 120 mg. of $FeCl_3$ and the reaction time was reduced from 15 hours to 5 hours and essentially the same product was obtained.

EXAMPLE 3

A reaction mixture was prepared by adding 333 g. of $[Me_2SiO]_4$ and 99 g. $[Ph_2SiO]_4$ (octaphenylcyclotetrasiloxane) to 3.42 g. of $Me_3SiCl$ and 450 mg. of $FeCl_3$. The mixture was heated for 15 hours at 125° C. with vigorous stirring. After cooling to room temperature, the reaction mass was diluted with 200 ml. of benzene and further reacted with 15 g. of sodium bicarbonate under anhydrous conditions. Further processing was accomplished as in Examle 1. The product was identified by standard analytical techniques as alpha-trimethylsiloxy-omega-hydroxy-dimethyldiphenylpolysiloxane having a viscosity of 1020 cps.

EXAMPLE 4

Equivalent results were achieved when Example 3 was repeated employing in place of the $[Ph_2SiO]_4$ any of the following: 100 g. $[CH_2=CH(CH_3)SiO]_4$, 100 g.

$[PhMeSiO]_3$ 100 g. $[CF_3CH_2CH_2(CH_3)SiO]_3$, 100 g.

$[Ph(CH_3CH_2)SiO]_4$ 100 g. $[Ph_2SiO]_6$ and 100 g. $[(CH_3CH_2)_2SiO]_9$.

EXAMPLE 5

Equivalent results were achieved when Example 3 was repeated employing in place of the $[Me_2SiO]_4$ and $[Ph_2SiO]_4$ a molecular weight equivalent of a mixture of cyclic phenylmethylsiloxanes $[PhMeSiO]_n$ where $n$ had a value of from 3 to 9 and an average value of about 5.

EXAMPLE 6

Equivalent results were achieved when Example 3 was repeated employing any of the following in place of the $Me_3SiCl$ in molar equivalents: $Me_3SiBr$, $PhMe_2SiCl$, $CH_2=CHMe_2SiCl$ $Ph_2MeSiCl$, $Me_3SiI$ or $Me_3SiF$.

EXAMPLE 7

Equivalent results were achieved when Example 3 was repeated employing in place of the $NaHCO_3$ any of the following: $LiHCO_3$, $KHCO_3$ and $CsHCO_3$.

That which is claimed is:

1. A method for preparing siloxane polymers of the general formula $R_3SiO(R_2SiO)_xH$ where each R is selected from the group consisting of alkyl, alkenyl, alkynyl, cycloalkyl, cycloalkenyl, aryl, aralkyl and alkaryl radicals and any halogenated derivatives of said radicals and said radicals having 1 to 18 carbon atoms and $x$ has a value of at least 10 comprising (A) reacting (1) a diorganocyclosiloxane of the general formula $(R_2SiO)_y$ where R is as above defined and $y$ has a value from 3 to 12 with (2) a triorganohalogenosilane of the formula $R_3SiX$ where R is as above defined and X is a halogen atom, in the presence of (3) a catalytic quantity of ferric chloride, at a temperature of from 10° to 200° C. and (B) reacting the product from (A) with an alkali metal hydrogen carbonate under anhydrous conditions to produce the desired polymeric product.

2. The method of claim 1 wherein anhydrous ferric chloride is employed as the catalyst in reaction (A).

3. The method of claim 1 wherein X is chlorine.

4. The method of claim 1 wherein the reactions are carried forward in an inert organic solvent.

5. The method of claim 1 wherein the reaction (A) is carried forward at a temperature in the range from 80° to 150° C.

6. The method of claim 1 wherein the alkali metal hydrogen carbonate is employed in molar excess.

7. The method of claim 1 wherein each R is a methyl or phenyl radical, X is Cl, $y$ is 3 to 9 and $x$ is 10 to 5,000.

References Cited

UNITED STATES PATENTS 3,135,713  6/1964  Brewer et al. ____ 260—448.2 X
3,355,474  11/1967  Wheeler _____ 260—448.2 X TOBIAS E. LEVOW, Primary Examiner W. F. W. BELLAMY, Assistant Examiner U.S. Cl. X.R.

260—46.5